United States Patent
Huai et al.

[19]

[11] Patent Number: 6,118,629
[45] Date of Patent: Sep. 12, 2000

[54] MAGNETIC HEAD WITH ALIGNED POLE TIPS AND POLE LAYERS FORMED OF HIGH MAGNETIC MOMENT MATERIAL

[75] Inventors: Yiming Huai, Pleasanton; Durga P. Ravipati, Saratoga; Mark D. Thomas, Hollister; Carlos Corona, Pleasanton; William D. Jensen, Fremont, all of Calif.

[73] Assignee: Read-Rite Corporation, Milpitas, Calif.

[21] Appl. No.: 09/332,973

[22] Filed: Jun. 15, 1999

Related U.S. Application Data

[62] Division of application No. 08/901,462, Jul. 28, 1997, Pat. No. 5,966,800.

[51] Int. Cl.[7] .................................................. G11B 5/147
[52] U.S. Cl. ............................................................ 360/126
[58] Field of Search .................................. 360/126, 113, 360/317

[56] References Cited

U.S. PATENT DOCUMENTS

5,452,164  9/1995  Cole ........................................ 360/126
5,793,578  8/1998  Heim ....................................... 360/126

*Primary Examiner*—A. J. Heinz
*Attorney, Agent, or Firm*—Nathan N. Kallman

[57] ABSTRACT

A magnetic head includes first and second pole tip layers separated by a nonmagnetic gap layer. The pole tips are made of a high magnetic moment material. The right side walls of the first and second pole tips are vertically aligned with each other. Similarly, the left side walls of the first and second pole tips are vertically aligned with one another. The side fringing flux from one pole tip to another is substantially reduced resulting in a magnetic head capable of writing data tracks with well defined boundaries. The possibility of the pole tips operating in magnetic saturation is reduced because the pole tips, formed of high magnetic moment material, is capable of accommodating high coercive force. The magnetic head can be fabricated as an inverted head or a non-inverted head capable of writing on magnetic media with high coercivity and at a high data transfer rate.

6 Claims, 12 Drawing Sheets

MAGNETIC HEAD WITH ALIGNED POLE TIPS AND POLE LAYERS FORMED OF HIGH MAGNETIC MOMENT MATERIAL

This application is a division of application Ser. No. 08/901,462 Jul. 28, 1997, now U.S. Pat. No. 5,966,800.

FIELD OF THE INVENTION

This invention relates to thin film magnetic heads and in particular to an assembly and methods of making magnetic heads having narrow pole widths with high saturation threshold levels capable of writing on magnetic media with high areal densities and coercivity.

BACKGROUND OF THE INVENTION

A typical inductive thin film magnetic head comprises a first magnetic pole layer and a second magnetic pole layer with an electrical coil between the two pole layers. The two pole layers contact each other at one end at a back closure to form a continuous magnetic path, with a narrow transducing gap at the other end. The portions of the first and second poles separated by the transducing gap are designated respectively as the first and second pole tips. In order to write data with narrow track widths and high linear recording densities, it is necessary to provide a magnetic head with narrow pole tips. However, there are technical problems associated with fabricating a magnetic head with narrow pole tips. A key problem confronted during manufacture is the alignment of the two pole tips. Various methods have been suggested to solve this problem.

The magnetic head described above is called an inductive head. The inductive head can be combined with a data reading transducer to form a merged head.

Figures 1, 1A, 2, 2A:
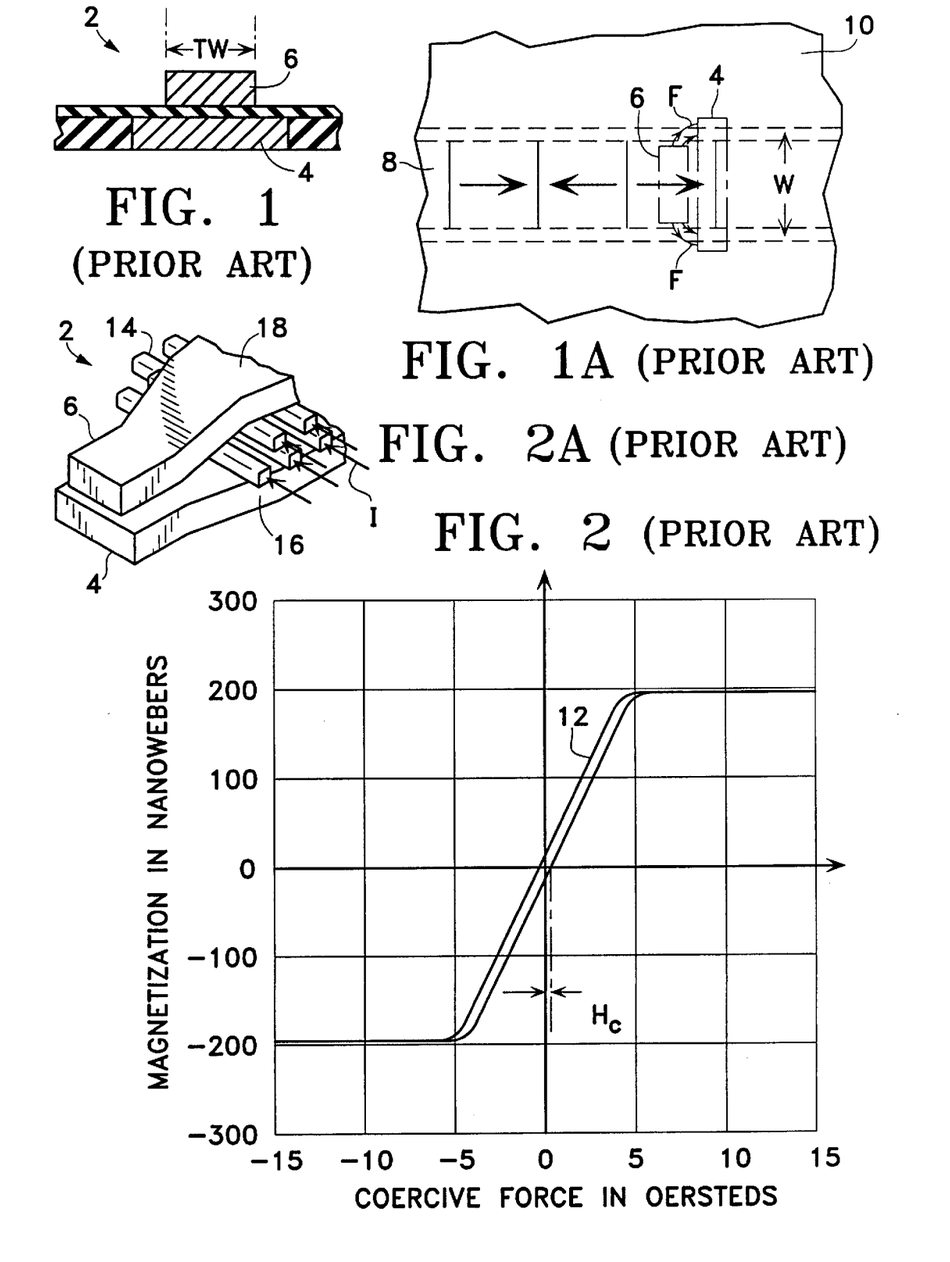
FIG. 1, as described above, is a cross-sectional front view of a prior art magnetic head having the first pole tip wider in lateral dimension than the second pole tip which is characterized by misalignment of the second pole tip during fabrication.
FIG. 1A schematically illustrates the effect of the side fringing flux on a registered data track written by the conventional magnetic head as shown in FIG. 1.
FIG. 2 is an hystersis characteristic of a ferromagnetic material used in a conventional magnetic head.
FIG. 2A is a fragmentary view of the magnetic head shown in FIG. 1 illustrating the tendency of the magnetic head of running into magnetic saturation starting from the pole tip region.

FIG. 1 shows a prior art approach in which a magnetic head 2 is fabricated with a first pole tip 4 wider in lateral dimension than a second pole tip 6. The wider first pole tip 4 tolerates a certain degree of misalignment during the deposition of the second pole tip 6. In the magnetic head 2, the width TW of the second pole tip 6 is intended to define the track width of the magnetic head 2. However, the problem with this approach is that due to the larger width of the first pole tip 4, magnetic flux fringing beyond the width of the second pole tip 6 is unavoidable. The fringing flux, such as flux lines F emanating from the second pole 6 to the first pole 4 as shown in FIG. 1A, would result in registering a data track 8 with a width W having ambiguous track boundaries, which seriously limit the track-to-track separations on the recording medium 10.

Modern day storage products are now built with ever decreasing physical sizes and increasing storage capacities. Magnetic heads are fabricated on microscopically confined areas. To increase the sensitivity of the magnetic head, the number of coil windings can be increased. However, any increase in coil windings is restricted by the confined areas. Furthermore, the higher the number of coil windings, the higher is the resultant inductance attached to the magnetic head. A magnetic head with high inductance is sluggish in response to data writing current and incapable of operating at high frequency ranges.

Another approach to increase the writing sensitivity of the magnetic head is to increase the magnitude of the writing current. Higher writing current generates higher Joule heat which increases the burden of the magnetic heat formed in a confined space in respect to the heat dissipation. However, an overriding issue is the premature magnetic saturation encountered by the magnetic yokes in response to higher writing current.

FIG. 2 shows the hysteresis curve 12 of a magnetic material such as Permalloy (NiFe) which includes a high permeability slope of the curve 12 and low coercivity $H_c$. Because of these characteristics, Permalloy is commonly used as the material for the magnetic yokes or tips of magnetic head. FIG. 2A is a fragmentary view of the conventional magnetic head 2 at the tip portion. When the writing current I passing through the coil 14 increases, the magnetic flux induced by the inductive coil 14 also increases. The magnetic flux which exerts coercive force on the magnetic yoke layers 16 and 18 also increases. For example, as shown in FIG. 2, when the coercivity exceeds 5 Oersteds, the magnetic yoke layers are fully saturated at 200 nanowebers and can no longer be responsive to any increase in writing current. Normally, magnetic saturation happens at the areas with the smallest physical dimensions. For instance, when magnetic saturation occurs, it first takes place at the first and second tip layers 4 and 6 and then slowly progresses to the areas with larger physical bulk, such as the yoke bodies 16 and 18. With pole tips built smaller for the purpose of writing narrow data tracks, the problem of magnetic saturation is further exacerbated.

Magnetic heads with pole tips having vertically aligned sidewalls have been proposed. U.S. Pat. No. 5,452,164, Cole et al., entitled "The Thin Film Magnetic Write Head", issued Sep. 19, 1995 discloses a magnetic head in which the vertically aligned sidewalls of the first and second pole tips are made possible by the process of ion milling through an overlying mask as a template. However, the magnetic head of Cole et at. does not address the magnetic saturation problem.

The problem of obscure data track boundaries written by a magnetic head and the problem of preventing the magnetic head from operating in premature saturation, when the head is built with a smaller physical size, need to be addressed. The problems are more intensified as storage products are now built with further reduced sizes and increased storage capacities. Data tracks written with ambiguous track boundaries seriously undermine track-to-track separations which in turn compromise the overall storage capacity of storage devices. A prematurely saturated magnetic head is incapable of operating at high frequency and is inept in performing high rate data transfer onto-media with high areal densities. Accordingly, there has been a need to provide magnetic heads capable of writing data tracks with well defined track boundaries, yet made available at reasonable manufacturing costs.

SUMMARY OF THE INVENTION

It is an object of the invention to provide a magnetic head capable of writing narrow data tracks with high linear recording densities.

It is another object of the invention to provide a magnetic head having a high saturation threshold capacity and capable of performing high data rate transfer onto media with high coercivities and high areal densities.

According to this invention, a thin film magnetic head includes first and second pole tips separated by a nonmagnetic gap layer. The pole tips are made of a high magnetic moment material. The right side and left side walls of the first and second pole tips are vertically aligned with each other respectively. The side fringing flux of one pole tip to another is substantially reduced resulting in a magnetic head capable of writing data tracks with well defined boundaries. Furthermore, the possibility of the pole tips running into magnetic saturation is reduced because the pole tips, made of high magnetic moment material, are tolerant of high coercivity media.

The magnetic head of the invention can be fabricated as an inverted or a noninverted head. In either case, the aligned pole tips are first made by depositing a tri-layer sandwich having a gap layer between the first pole layer and the second pole layer on the substrate. The tri-layer sandwich is then etched away through a masking layer, thereby leaving at least a stack of layers formed on the substrate. The stack of layers constitutes the magnetic pole tip region of the magnetic head with aligned sidewalls for the pole tips. In accordance with the invention, the pole tips can be narrowly defined, thereby allowing the inventive head to write on magnetic media with narrow data track widths. The problem of premature magnetic saturation is avoided because the pole tips are made of high magnetic moment material.

BRIEF DESCRIPTION OF THE DRAWINGS

The invention will be described in greater detail with reference to the drawings in which.

Like reference numerals refer to like parts throughout the drawings.

DETAILED DESCRIPTION OF THE INVENTION

Figure 3:
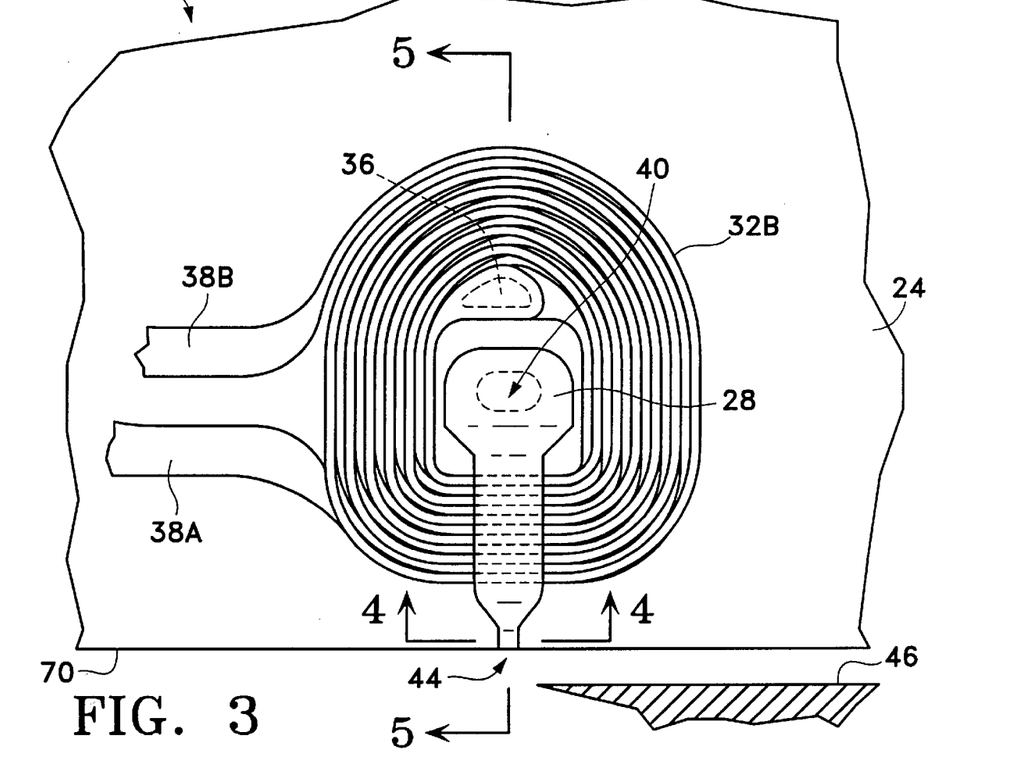
FIG. 3 is a top plan view, partly broken away, of an embodiment of the invention fabricated as a non-inverted head.
Figure 4:
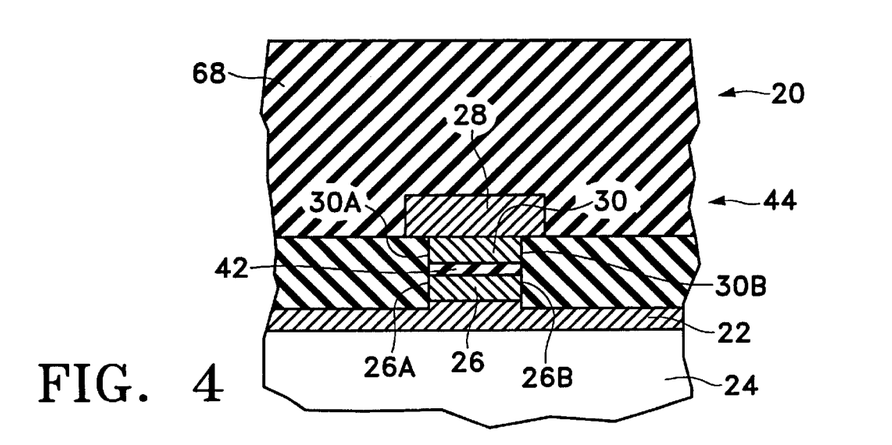
FIG. 4 is a cross-sectional front view taken along the line 4—4 of FIG. 3.
Figure 5:
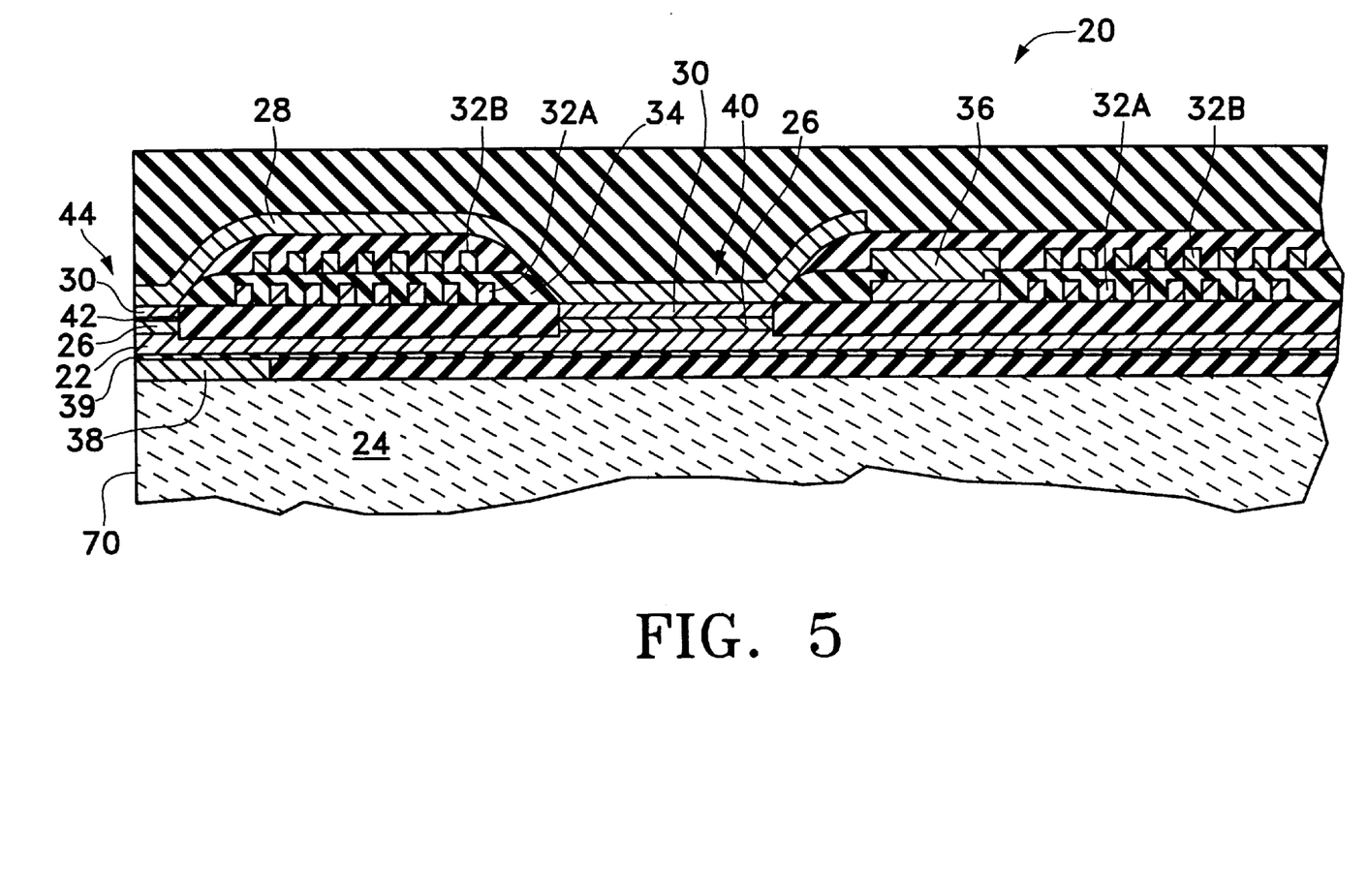
FIG. 5 is a cross-sectional side view taken along the line 5—5 of FIG. 3.

FIG. 3 shows the top plan view of a magnetic head 20, made in accordance with this invention. For the sake of clarity in illustration, the top protective and insulating layers in FIG. 3 are not illustrated so as to expose the relevant components of the magnetic head 20. However, the top layers are shown in FIGS. 4 and 5 which are cross-sectional front and side views taken along the lines 4—4 and 5—5, respectively, of FIG. 3.

The magnetic head 20 includes a first yoke layer 22 formed with a first pole tip layer 26 and disposed on a substrate 24. The substrate 24 can be made of a non-magnetic and electrically insulating material, such as alumina titanium carbide ($Al_2O_3TiC$) or silicon carbide (SiC). The substrate 24 can be pre-fabricated with components. For example, in a merged head, various component layers, such as a first shield layer 38 and a read transducer 39, may be fabricated in advance and thereafter serve as a substrate for the first yoke layer 22. Above the first yoke layer 22 is a second pole layer 28 which is formed with a second pole tip layer 30. Sandwiched between the first and second yoke layers 22 and 28 are inductive coils 32A and 32B separated from each other by dielectric material 34 (FIG. 5). The coils 32A and 32B are electrically connected to each other by means of an electrical feedthrough 36. Electrical current can be directed to and from the serially connected coils 32A and 32B via a pair of electrical leads 38A and 38B (FIG. 3).

The first and second yoke layers 22 and 28 are in direct contact at the back closure region 40 but are separated by a transducing gap layer 42 at the pole tip layers 26 and 30. During the data writing mode, the magnetic head 20 flies above the surface of a recording medium 46 through a thin film of air. Electrical current representative of data signals passes through the inductive coils 32A and 32B via the leads 38A and 38B and induces magnetic flux. The magnetic flux at the gap 42 registers on the magnetic material coated on the medium 46.

During the data reading mode, magnetic flux emanating from a recording medium surface 46 is sensed at the gap layer 42. The magnetic flux induces electrical current in the inductive coils 32A and 32B, which represents the recorded data. The induced current in the coils 32A and 32B flows through the leads 38A and 38B for further processing.

The magnetic head 20 of the invention comprises vertically aligned side walls for the first and second pole tip layers 26 and 30 as shown in FIGS. 4 and 5. Specifically, the left side wall 26A of the first pole tip 26 is in vertical alignment with the left side wall 30A of the second pole tip 30. Similarly, the right side wall 26B of the first pole tip 26 is flush with the right side wall 30B of the second pole tip 30. The aligned side walls 26A, 30A, and 26B, 30B substantially reduce fringing flux from one pole to another, thereby enabling the magnetic head 20 to write data with well defined data tracks on the medium surface 46.

FIGS. 6A–6M are sequential drawings schematically illustrating the fabrication process of the magnetic head 20 of the invention.

Figure 6A:
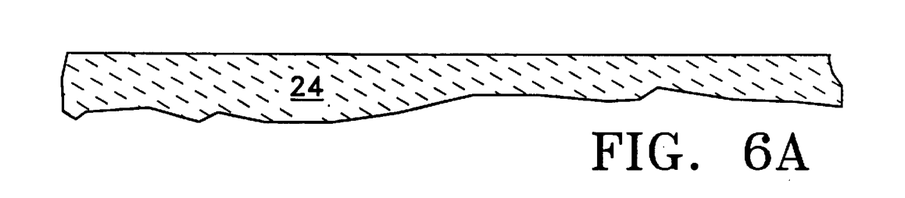
FIGS. 6A–6S are sequential views schematically illustrating the process of forming the magnetic head of the invention as shown in FIGS. 3–5.
Figure 6B:
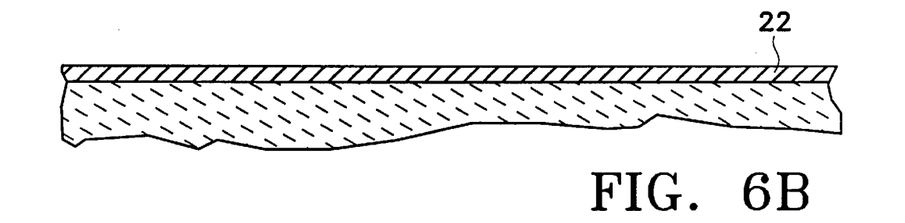

First a substrate 24 is provided as shown in FIG. 6A. The substrate 24 can be with or without prefabricated components. A first yoke layer 22 is then deposited on the top of the substrate 24 by sputtering to a thickness of approximately 0.5 $\mu$–3.5 $\mu$, for example. The resultant structure is shown in FIG. 6B.

Figure 6C:
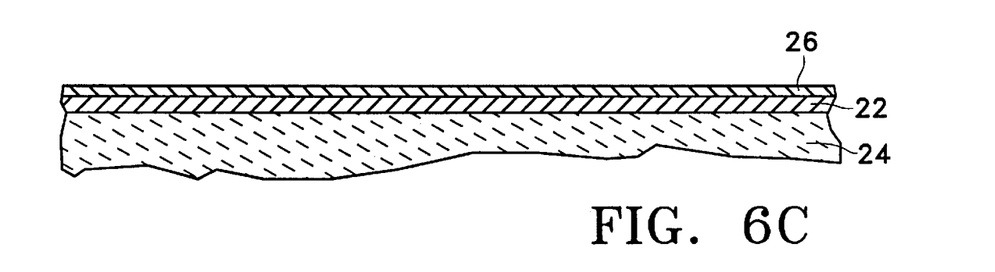

As shown in FIG. 6C, a first pole tip layer 26 is deposited on the first yoke layer 22 either by sputtering or electroplating to a thickness of approximately 0.8 $\mu$–2.5 $\mu$. Materials for the first yoke layer 22 and the first pole tip layer 26 are preferably materials having a high magnetic moment, such as cobalt zirconium tantalum alloy (CoZrTa), cobalt zirconium niobium alloy (CoZrNb), and iron tantalum nitride alloy (FeTaN).

Figure 6D:
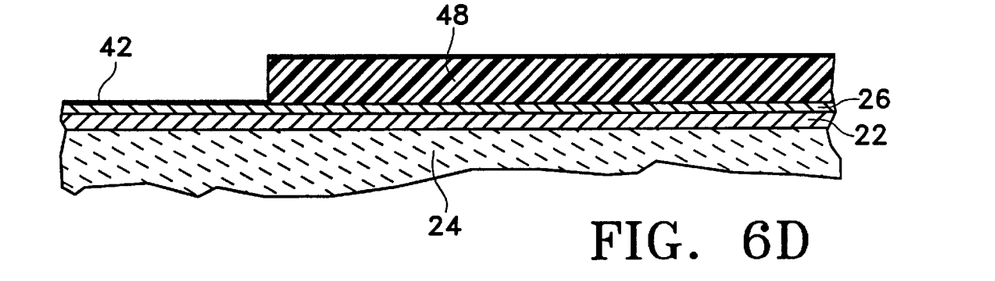
Figure 6E:
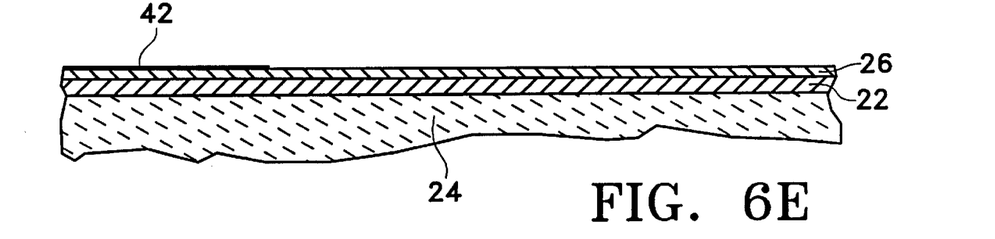

A photoresist layer 48 is then patterned on the first pole tip layer 22 by conventional photolithography. Thereafter, a gap layer 42 is deposited by sputtering as shown in FIG. 6D. The photoresist layer 48 is then removed using a photoresist solvent. The gap layer 42 deposited on the photoresist layer 48 is lifted off along with the removed photoresist material. The resultant structure up to this step is shown in FIG. 6E.

Figure 6F:
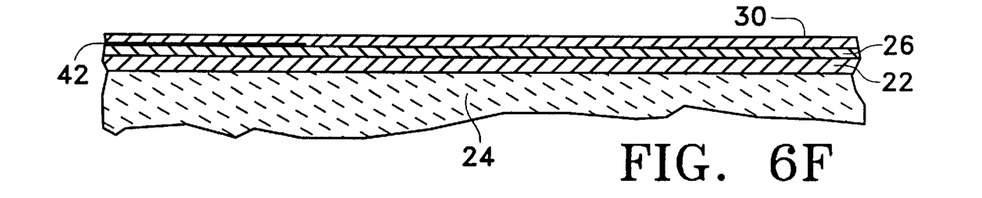
Figure 6G:
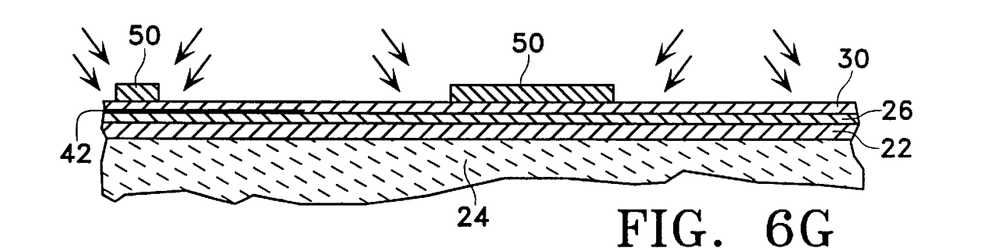
Figure 6H:
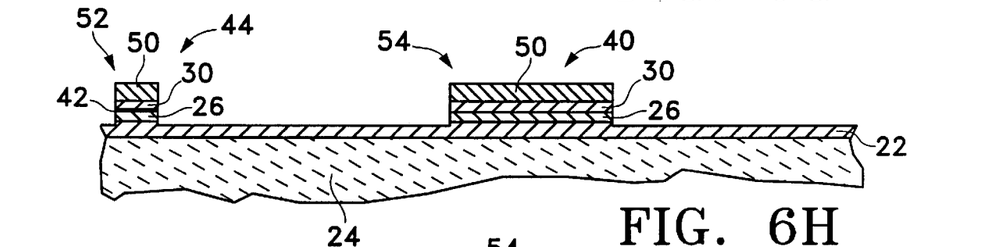

A second pole tip layer 30 is deposited on the structure by sputtering to a thickness of approximately 0.8 $\mu$–2.5 $\mu$, for example, as shown in FIG. 6F. Another mask 50 is patterned on the second pole tip layer 30, as shown in FIG. 6G. The material for the mask 50 can be photoresist or metal. The masked structure is then subject to an ion milling process. The mask layer 50 is resistant to milling ions. As a consequence, areas not protected by the mask layer 50 are removed, resulting in two stacks of layers 52 and 54 formed on the substrate 24 as shown in FIG. 6H. It should be noted that at this juncture, the first pole tip layer 26 is separated from the second pole tip layer 30 by the gap layer 42 in the stack 52 at the pole tip region 44. However, the first pole tip layer 26 contacts the second pole tip layer 30 in the stack 54 at the back gap region 40.

Figure 6I:
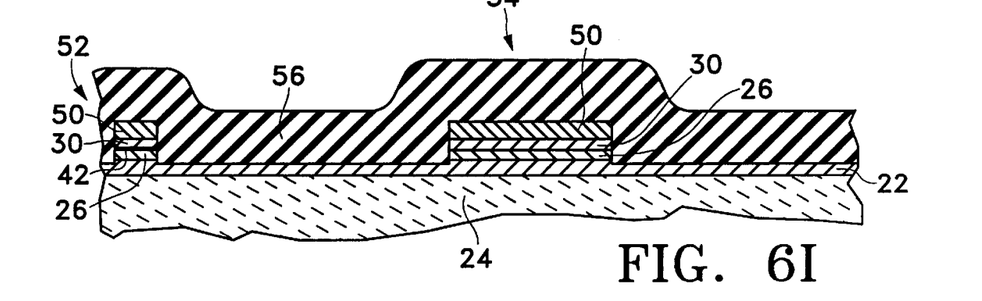

Through the process of either sputtering or plasma enhanced chemical vapor deposition (PECVD), a protective layer 56 is deposited on the structure with the stacks of layers 52 and 54. In the preferred method, the sputtering method is used and the protective layer 56 is deposited over and around the stacks of layers 52 and 54 to a thickness of approximately 3 $\mu$ to 4 $\mu$. The resultant structure up to this step is shown in FIG. 6I.

Figure 6J:
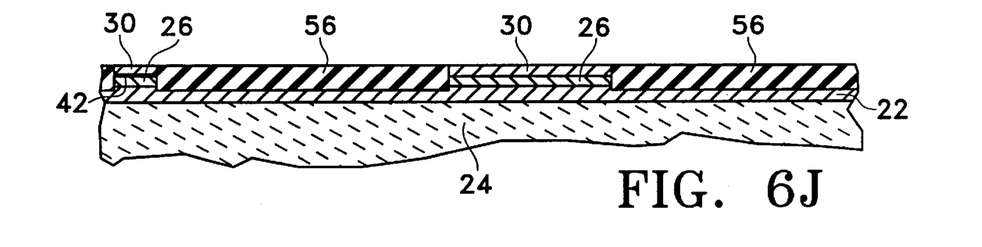

The structure is then subject to a two-step leveling process in which the protective layer 56 is planarized via mechanical lapping with the assistance of a slurry which may include alumina ($Al_2O_3$) or silicon dioxide ($SiO_2$) for gross material removal, for example. Thereafter, ion milling is employed for the removal of material to a fine level, thereby exposing the second pole tip layer,30. The resultant structure up to this step is shown in FIG. 6J.

Figure 6K:
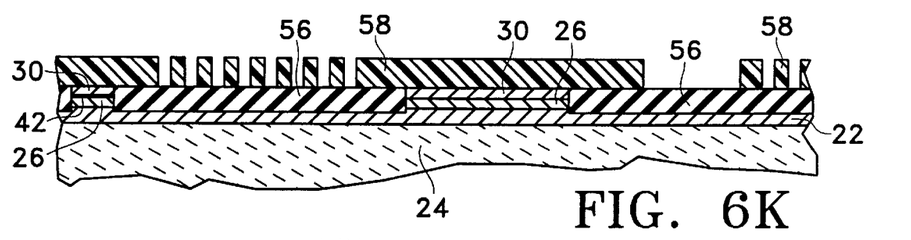

A thin layer of copper (Cu) (not shown), called the seed layer, is then sputtered on the polished surface of the structure. A photoresist mask 58 is then patterned on the structure as shown in FIG. 6K.

Figure 6L:
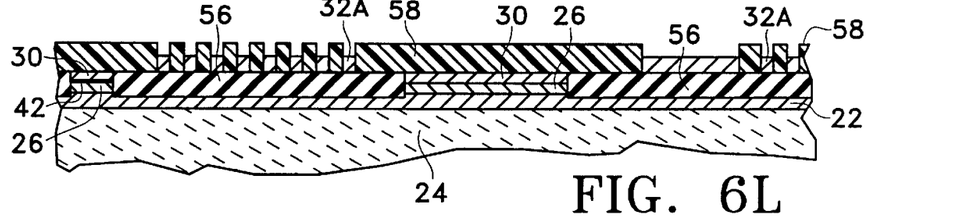
Figure 6M:
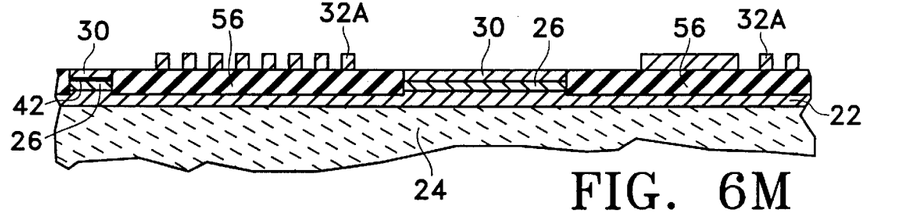
Figure 6N:
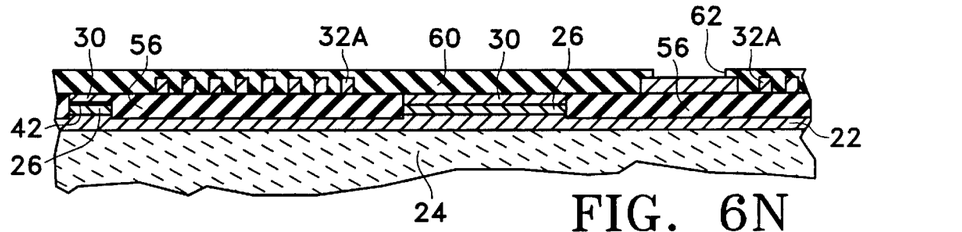

A first coil layer 32A is then electroplated on the patterned photoresist layer 58 as shown in FIG. 6L. The photoresist layer 58 is thereafter removed, resulting in the formation of the first coil layer 32A disposed on the structure, which up to this step is shown in FIG. 6M. The Cu seed layer is then etched away by lightly dipping the substrate with the Cu seed layer in an etchant bath filled with ammonium persulfate ($(NH_4)_2S_2O_3$). A layer of dielectric material 60 is then deposited on the first coil layer 32A by either the PECVD or the sputtering method. The dielectric material 60 can be selected from a variety of insulating materials, such as alumina ($Al_2O_3$), silicon dioxide ($SiO_2$), silicon nitride ($Si_3N_4$), aluminum nitride (AlN) or diamond-like-carbon (DLC). A feedthrough 62 is then formed in the dielectric layer 60 by conventional photolithography and etching methods, as shown in FIG. 6N. The formation of the feedthrough 62 is for the purpose of electrically connecting the first coil layer 32A with the subsequently deposited second coil layer 32B.

Figure 6O:
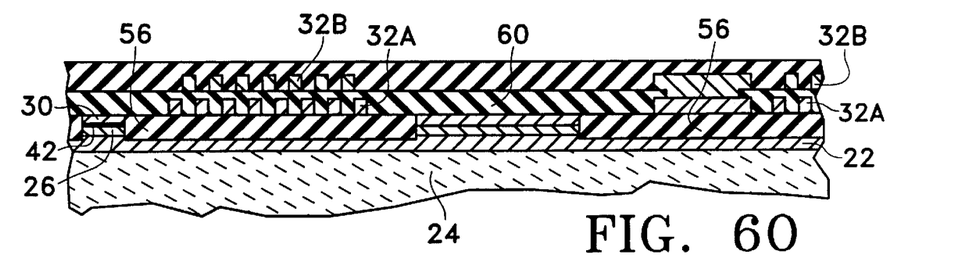

The process of forming second coil layer 32B is substantially the same as forming the first coil layer 32A. For the sake of conciseness, the process of making the second coil 32B is not repeated. The resultant structure up to this step is shown in FIG. 6O.

Figure 6P:
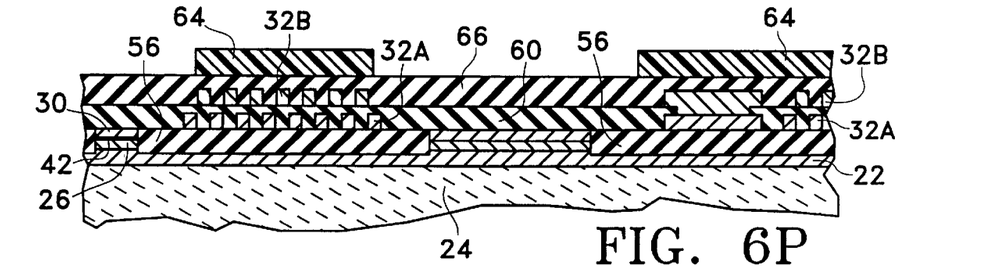
Figure 6Q:
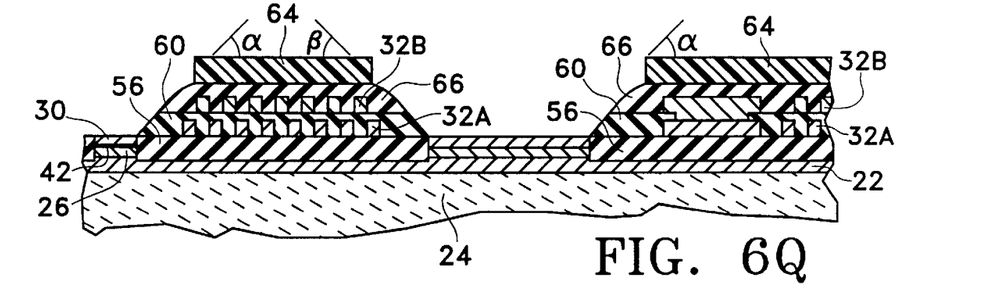
Figure 6R:
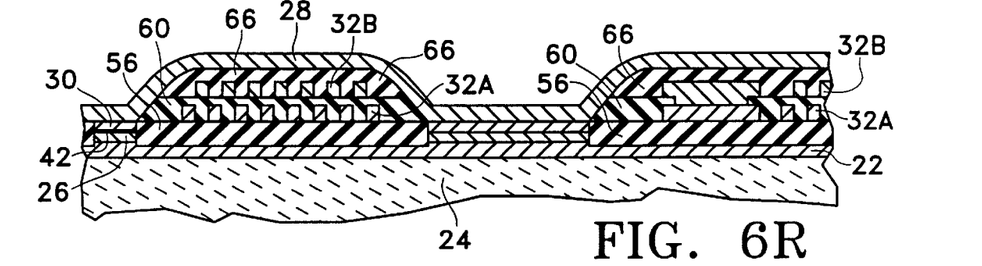
Figure 6S:
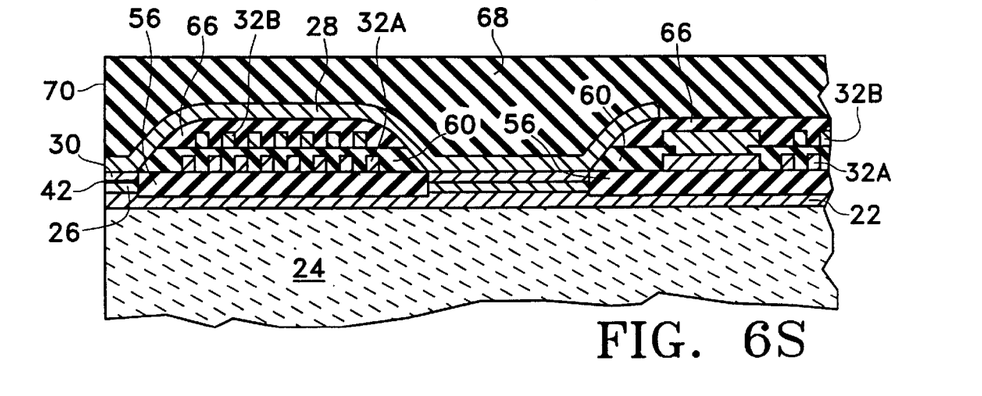

The step of depositing a second yoke layer 28 follows. First, a photoresist mask 64 is patterned on the dielectric material 66 as shown in FIG. 6P. Either the technique of wet etching or reactive ion beam etching (RIBE) can be employed to define the apex angles $\alpha$ and $\beta$ of the second yoke layer 28 as shown in FIG. 6Q. The photoresist layer 64 is then removed. A layer of high magnetic moment materials such as cobalt zirconium tantalum alloy (CoZrTa), cobalt zirconium niobium alloy (CoZrNb), or iron tantalum nitride alloy (FeTaN) is then sputtered on the structure as shown in FIG. 6R. Thereafter, the second yoke layer 28 can be patterned via the conventional photolithography process, for example. Shown in FIG. 3 is the plan view of the second yoke layer 28 after the patterning process. After depositing an overcoat layer 68 on the patterned second yoke layer 28, the resultant structure is as shown in FIG. 6S.

A final lapping step is performed on the tip portion 44 of the magnetic head 20 for the purpose of securing a smooth air bearing surface (ABS) 70 as shown in FIG. 5.

Figure 7:
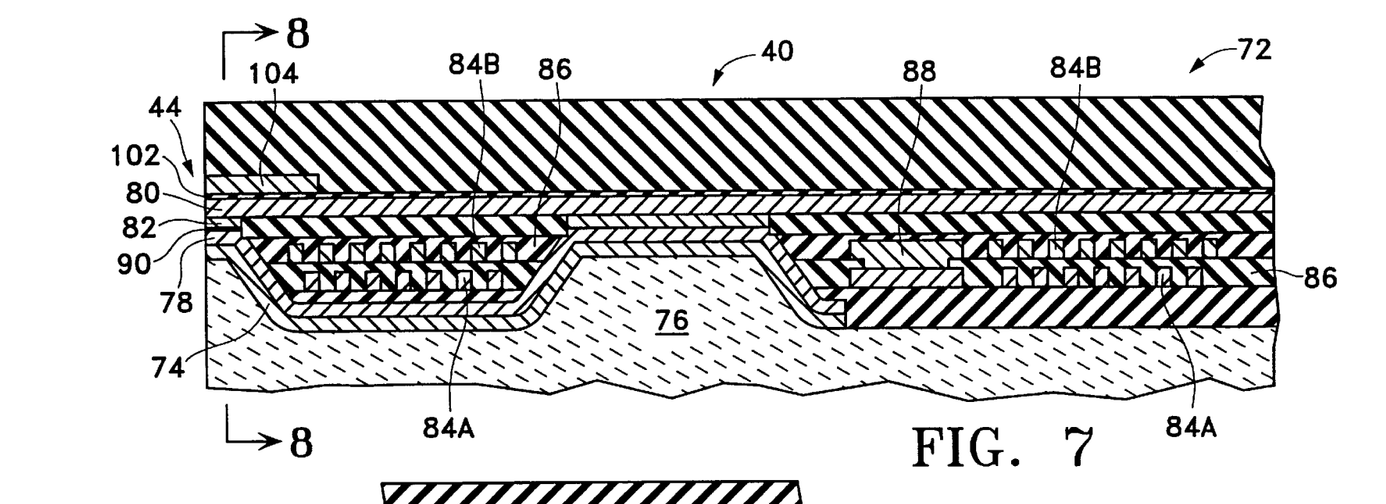
FIG. 7 is a cross-sectional front view, shown in part, of another embodiment of the invention fabricated as an inverted head.
Figure 8:
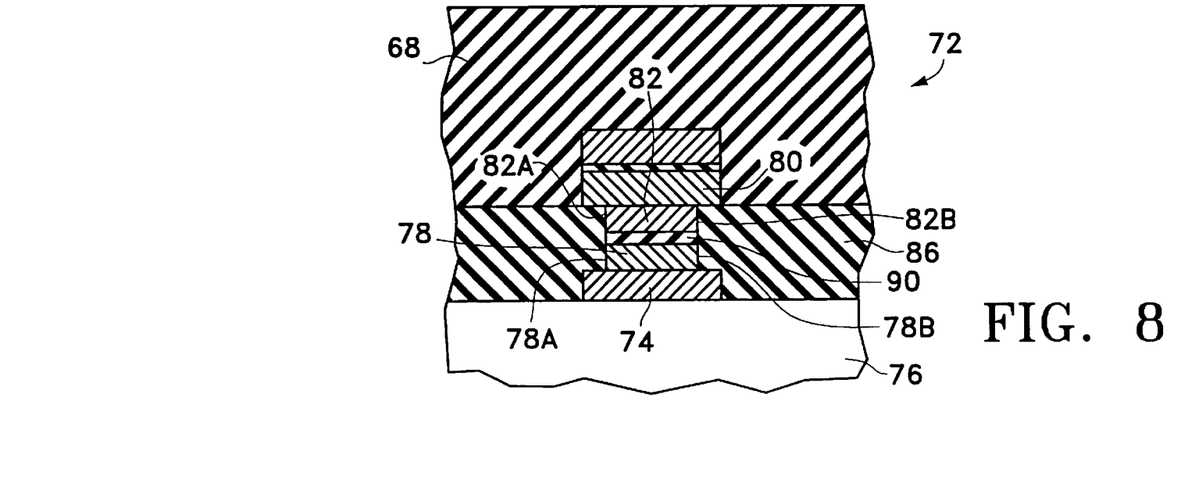
FIG. 8 is a cross-sectional front view taken along the line 8—8 of FIG. 7.

FIGS. 7 and 8 show a second embodiment of the invention fabricated as an inverted head 72. The magnetic head 72 of this embodiment includes a second yoke layer 74 disposed on a substrate 76. As shown in FIG. 7, the second yoke layer 74 is associated with a second pole tip layer 78. As with the first embodiment, the substrate 76 can be made of a non-magnetic and electrically insulating material such as alumina titanium carbide ($Al_2O_3TiC$) or silicon carbide (SiC). Above the second yoke layer 74 is a first yoke layer 80 associated with a first pole tip layer 82. In this embodiment, sandwiched between the second and first yoke layers 74 and 80 are inductive coil layers 84A and 84B separated from each other by dielectric material 86. The coil layers 84A and 84B are electrically connected by means of an electrical feedthrough 88.

As with the first embodiment, the second and first yoke layers 74 and 80 are in direct contact at a back closure region 40. However at the pole tip region 44, the first and second pole tip layers 78 and 82 are separated by a gap layer 90. The magnetic head 72 also comprises vertically aligned side walls for the second and first pole tip layers 78 and 82 as shown in FIG. 8. Specifically, the left side wall 82A of the first pole tip 82 is in vertical alignment with the left side wall 78A of the second pole tip 78. Similarly, the right side wall 82B of the first pole tip 82 is flush with the right side wall 78B of the second pole tip 78.

FIGS. 9A–9M are sequential drawings schematically illustrating the fabrication process of the magnetic head 72

Figure 9A:
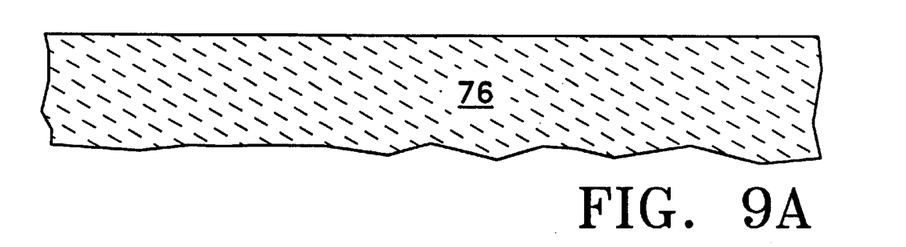
FIGS. 9A–9N are sequential views schematically illustrating the process of forming the magnetic head of the invention as shown in FIGS. 7–8.
Figure 9B:
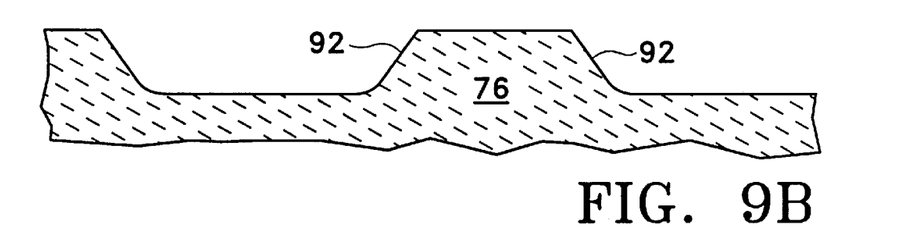

The fabrication process starts with a substrate 76 as shown in FIG. 9A. Cavities 92 are formed in the substrate 76 by the conventional process of ion milling as shown in FIG. 95.

Figure 9C:
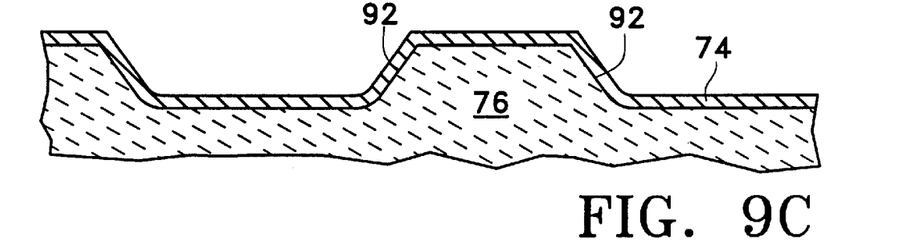
Figure 9D:
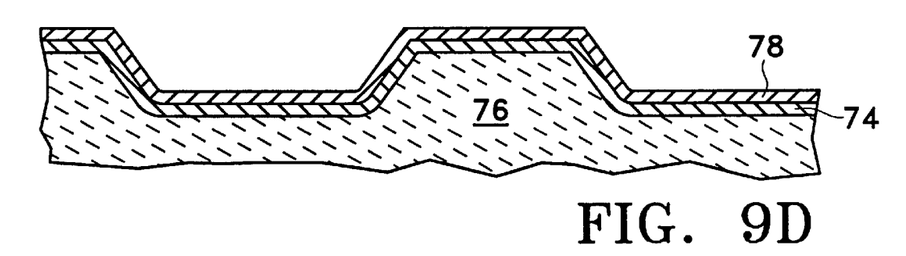

A second yoke layer 74 is deposited on the substrate 92 lining the cavities 92 via the process of sputtering for example, to a thickness of approximately 0.5 $\mu$–3.5 $\mu$ as shown in FIG. 9C. A second pole tip layer 78 is then electroplated or sputtered on the second yoke layer 74 as shown in FIG. 9D.

Figure 9E:
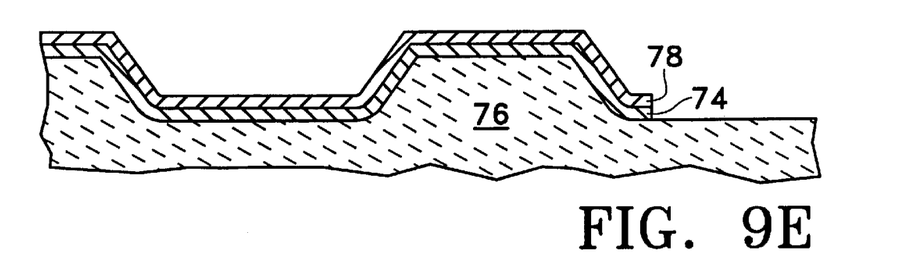

Conventional photolithography and etching methods are employed to pattern the second yoke and pole tip layers 74 and 78. Materials for the second yoke layer 74 and the second pole tip layer 78 are preferably materials having a high magnetic moment, such as cobalt zirconium tantalum alloy (CoZrTa), cobalt zirconium niobium alloy (CoZrNb), or iron tantalum nitride alloy (FeTaN). The resultant structure up to this step is shown in FIG. 9E.

Figure 9F:
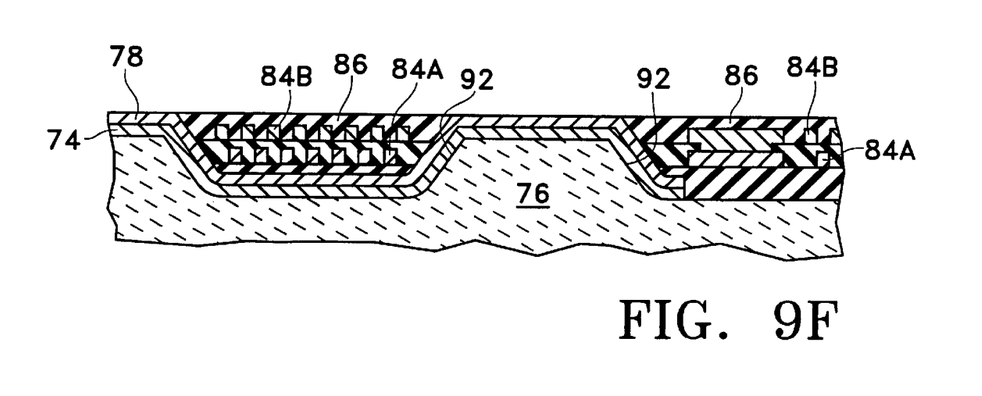

What follows is the formation of the first and second coil layers 84A and 84B above the second pole tip layer 78 and in the cavities 92. The process of forming the coil layers 84A and 84B is substantially the same as the corresponding process for the previous embodiment. For the sake of conciseness, the process is not repeated. The resultant structure with the deposited coil layers 84A and 84B is shown in FIG. 9F.

Figure 9G:
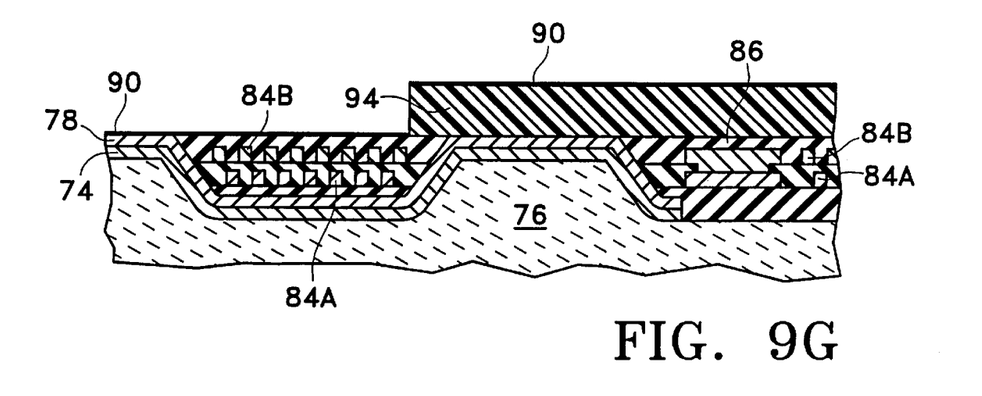
Figure 9H:
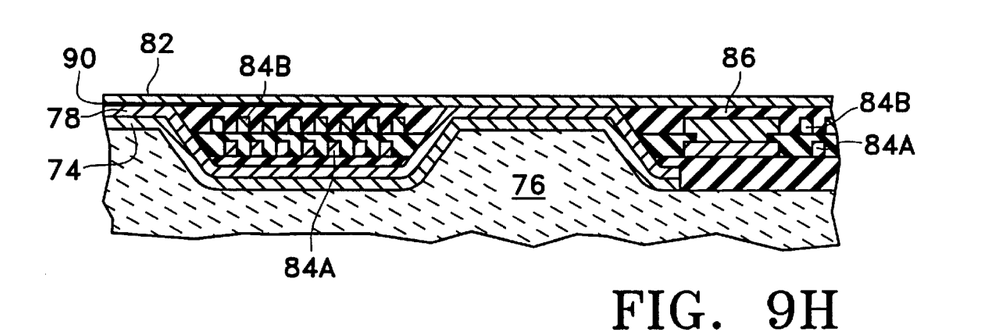

A photoresist layer 94 is then patterned on the top of the structure by conventional photolithography. Thereafter, a write gap layer 90 is deposited on the masked substrate as shown in FIG. 9G. The photoresist layer 94 is then removed using a photoresist solvent. The write gap layer 94 deposited on the photoresist layer 94 is then lifted off along with the removed photoresist material. A first pole tip layer 82 is then sputtered on the top of the write gap layer 90 and the second pole tip layer 78. The resultant structure up to this step is shown in FIG. 9H.

Figure 9I:
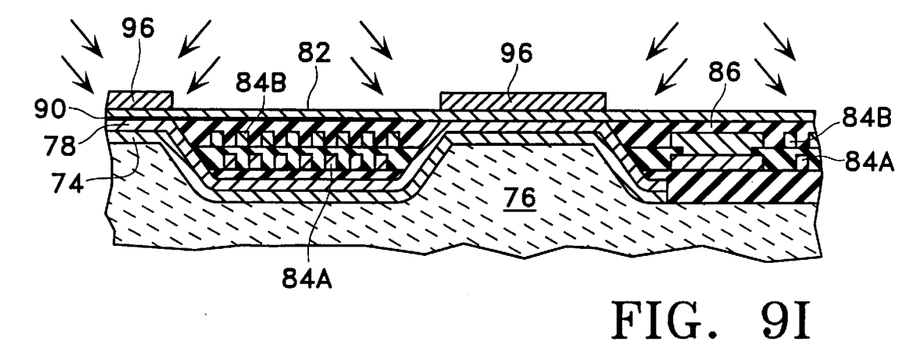
Figure 9J:
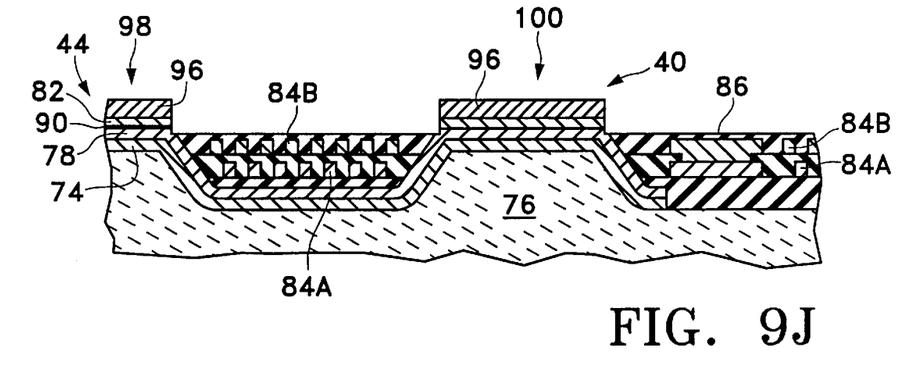

Another mask 96 is patterned on the first pole tip layer 82. The material for the mask 96 can be either photoresist or metal. The masked structure is then subject to ion milling. The mask layer 96 is resistant to the milling ions as shown in FIG. 9I. As a consequence, areas not protected by the mask layer 96 are removed, resulting in two stacks of layers 98 and 100 formed on the substrate 24 as shown in FIG. 9J. After the ion milling process, the second pole tip layer 78 is separated from the first pole tip layer 82 by the gap layer 90 in the stack 98 at the pole tip region 44. However, the second pole tip layer 78 is in contact with the first pole tip layer 82 in the stack 100 at the back gap region 40.

Figure 9K:
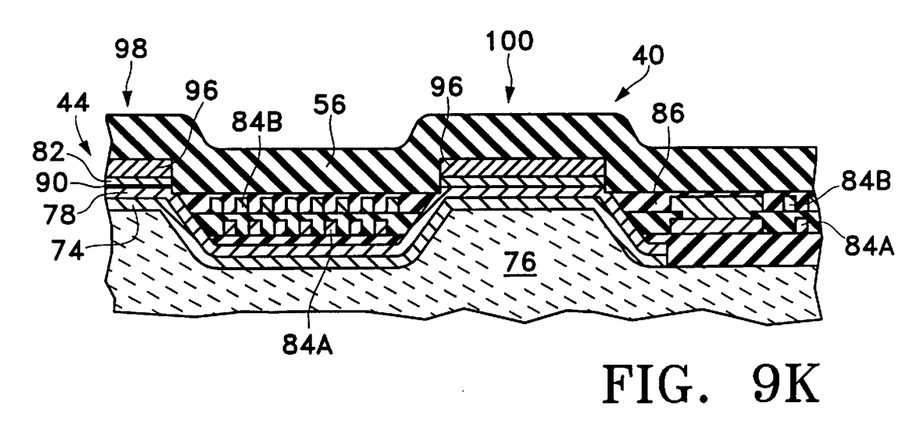

Through the process of either sputtering or PECVD, a protective layer 56 is deposited on the structure with the stacks of layers 98 and 100. The protective layer 56 is deposited over and around the stacks of layers 98 and 100 to a thickness of approximately 3 $\mu$ to 4 $\mu$ as shown in FIG. 9K.

Figure 9L:
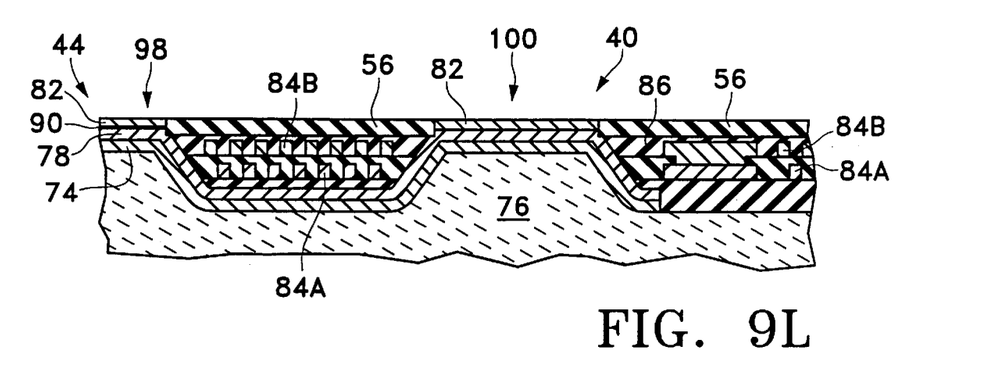

The structure is then subject to a two-step leveling process in which the protective layer 56 is planarized via mechanical lapping with the assistance of a slurry which may include alumina ($Al_2O_3$) or silicon dioxide ($SiO_3$) for gross material removal, for example. Thereafter, the ion milling process is employed for the removal of material to a fine level, thereby exposing the second pole tip layer 82. The resultant structure up to this step is shown in FIG. 9L.

Figure 9M:
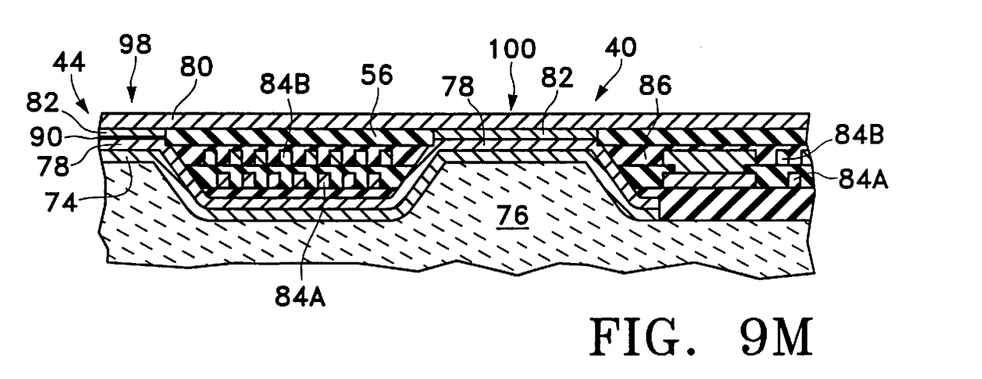

The first yoke layer 80 is then deposited on the structure by the sputtering method. The first yoke layer 80 is deposited in contact with the pole tip layer 82 at the pole tip region 44 and the back gap region 40. As with the previous embodiment, the material for the first yoke and pole tip layers 80 and 82 are preferably a material with a high magnetic moment, such as cobalt zirconium tantalum alloy (CoZrTa), cobalt zirconium niobium alloy (CoZrNb), or iron tantalum nitride alloy (FeTaN). Thereafter, the first yoke layer 80 is patterned using conventional lithography and etching methods. The resultant structure up to this step is shown in FIG. 9M.

Figure 9N:
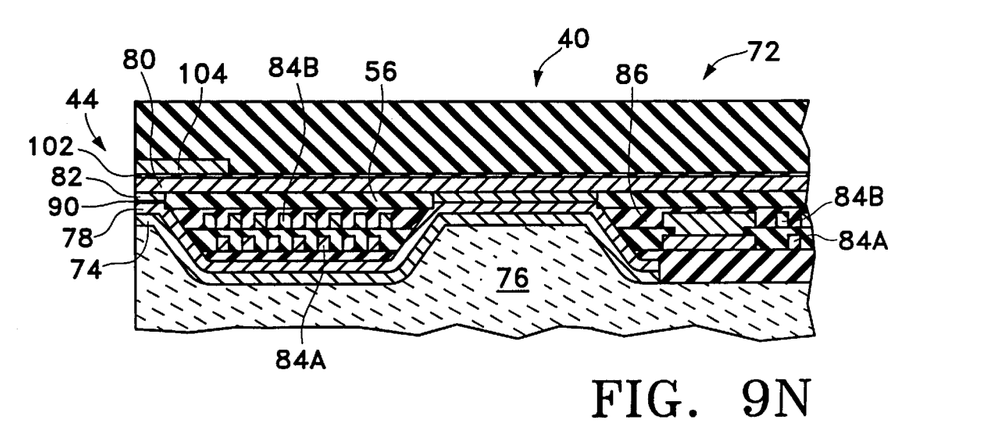

If the magnetic head 72 is fabricated as a merged head, the first yoke layer 80 also acts as a second shield layer. Furthermore, a read transducer 102 and a first shield layer 104 are fabricated on the first yoke layer 80. Fabrication processes for the read transducer 102 and the first shield layer 104 are conventional and need not be further elaborated. The resultant structure 72 fabricated as a merged head is shown in FIG. 9N.

The advantage of making a merged magnetic head as an inverted head is substantial. In the fabrication of a magnetic head, depositing layers for the write transducer portion, such as the coil layers 84A and 84B and the filling dielectric layer 86 very often involve high-temperature processing cycles.

On the other hand, depositing layers for the read transducer 102 requires depositing and patterning of ultra-thin delicate layers which may be detrimentally affected by the higher temperature processes. Reserving the fabrication of the read transducer 102 at the end of the production process provides the benefits of preventing the read transducer from being subjected to high temperature cycles thereby improving final production yield and reliability of the magnetic head 72.

In the magnetic heads described in accordance with the invention, the pole tips are narrowly defined with aligned sidewalls, thereby enabling the magnetic head of the invention to write on magnetic media with high areal densities. Notwithstanding the narrow pole tips, the magnetic heads of the invention are less prone to run into premature magnetic saturation because the pole tips are made of high magnetic moment material, thereby allowing the magnetic heads of the invention to write on magnetic media with high coercivity and at high data rate transfer.

Other variations are possible within the scope of the invention. For example, the dielectric material 66 or 86 need not be alumina as described. Other materials such as silicon dioxide ($SiO_2$) or silicon nitride (SiN), or hard-baked photoresist can well be used as substitutes. These and other changes in form and detail may be made therein without departing from the scope and spirit of the invention.

What is claimed is:

1. A magnetic head comprising:
a substrate having a first yoke layer formed thereon;
a stack of layers formed on said first yoke layer, said stack of layers including a gap layer disposed between a first pole tip layer and a second pole tip layer, said second pole tip layer being disposed farther from said first yoke layer than said first pole tip layer, said first and second pole tip layers being formed of high magnetic moment material, said first pole tip layer further including first and second sidewalls, and said second pole tip layer further including third and fourth sidewalls, wherein said first sidewall is coplanar with said third sidewall and said second sidewall is coplanar with said fourth sidewall;
a second yoke layer having a portion thereof disposed in contact with said second pole tip layer; and
a first coil layer disposed between said first and second yoke layers, said first coil layer being dielectrically separated from said first and second pole tip layers, wherein said first pole layer and said first coil layer are formed in at least one cavity formed in said substrate.

2. The magnetic head as set forth in claim 1 wherein said head is a non-inverted head.

3. The magnetic head as set forth in claim 1 wherein said head is an inverted head.

4. The magnetic head as set forth in claim 1 wherein said coil layer is a first coil layer, said head further including a second coil layer disposed above and dielectrically insulated from said first coil layer.

5. The magnetic head as set forth in claim 1 wherein said substrate includes a prefabricated read transducer.

6. The magnetic head as set forth in claim 1 wherein said first and second pole tip layers and said first and second yoke layers are formed of a material selected from a group consisting of cobalt zirconium tantalum alloy, cobalt zirconium niobium alloy, and iron tantalum nitride alloy.

* * * * *